(12) United States Patent
Graville

(10) Patent No.: US 6,488,905 B2
(45) Date of Patent: Dec. 3, 2002

(54) DESTRUCTION OF WASTE GAS

(75) Inventor: Stephen Rhys Graville, Nether Edge (GB)

(73) Assignee: The BOC Group plc, Windlesham (GB)

(*) Notice: Subject to any disclaimer, the term of this patent is extended or adjusted under 35 U.S.C. 154(b) by 106 days.

(21) Appl. No.: 09/731,136

(22) Filed: Dec. 6, 2000

(65) Prior Publication Data

US 2001/0018035 A1 Aug. 30, 2001

(30) Foreign Application Priority Data

Dec. 10, 1999 (GB) .............................. 9929332

(51) Int. Cl.[7] .............................. C01C 1/14; C01B 3/04; C01B 17/16
(52) U.S. Cl. .................. 423/237; 423/573.1; 423/648.1
(58) Field of Search ................. 423/237, 648.1, 423/573.1

(56) References Cited

U.S. PATENT DOCUMENTS

| | | | |
|---|---|---|---|
| 3,661,507 A | 5/1972 | Breitbach et al. ........... | 423/573 |
| 3,822,337 A * | 7/1974 | Winderlich et al. ...... | 423/573.1 |
| 4,101,642 A * | 7/1978 | Tippmer ................... | 423/573.1 |
| 4,395,390 A | 7/1983 | Desgrandchamps et al. ..... | 423/573 |
| 5,139,764 A * | 8/1992 | Szekely ................... | 423/573.1 |
| 5,904,910 A | 5/1999 | Stevens et al. .......... | 423/574.1 |

FOREIGN PATENT DOCUMENTS

GB 676 287 7/1952

* cited by examiner

Primary Examiner—Wayne A. Langel
Assistant Examiner—Maribel Medina
(74) Attorney, Agent, or Firm—Philip H. Von Neida; Salvatore P. Pace

(57) ABSTRACT

A gas stream containing at least 50% by volume of ammonia but eventually no hydrogen sulphide is burned in a reaction region which is supplied with oxygen and oxygen-enriched air. Both combustion and thermal cracking of ammonia takes place in the reaction region. The rate of supplying oxygen molecules to the reaction region is from 75 to 98% of the stoichiometric rate required for full combustion of all combustible fluids supplied to the reaction region. Under these conditions essentially no ammonia remains in the effluent gas but formation of oxides of nitrogen can be minimised.

17 Claims, 1 Drawing Sheet

DESTRUCTION OF WASTE GAS

FIELD OF THE INVENTION

Figure 1:
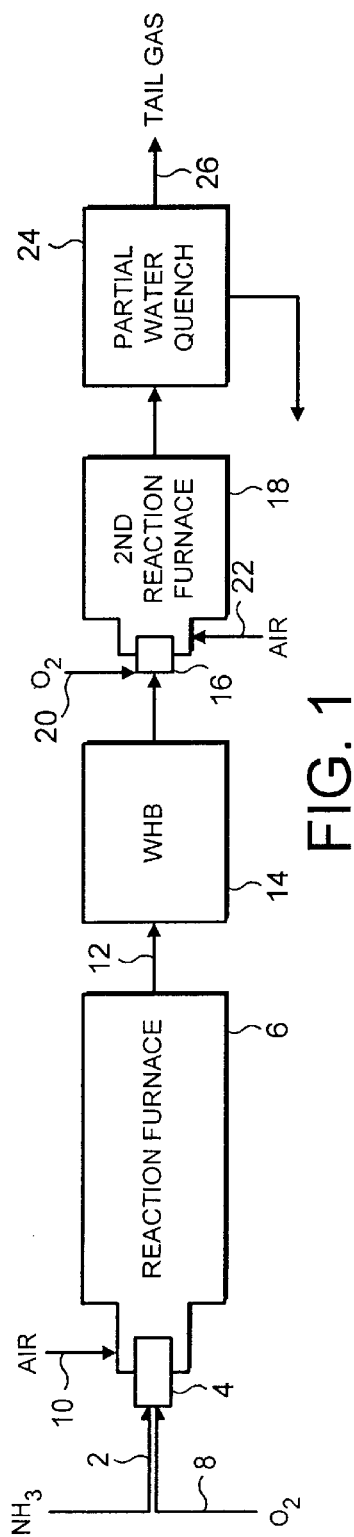

This invention relates to a method of destroying a waste gas comprising ammonia.

BACKGROUND OF THE INVENTION

Waste gas streams comprising ammonia are frequently encountered in refineries. Sometimes such waste gas streams also contain hydrogen sulphide in comparable proportions. These gas streams can be employed as a feed stream to the Claus process.

Other waste gas streams formed in refineries can contain little or no hydrogen sulphide but may contain ammonia, sometimes as essentially the only combustible component thereof. There is a need to destroy essentially all of the ammonia in such gas streams but without creating appreciable amounts of oxides of nitrogen in the effluent gas arising from the destruction process.

It is an aim of the present invention to provide a method of destroying a waste gas stream containing at least 50 per cent by volume of ammonia but essentially no hydrogen sulphide which makes it possible to solve the above problem.

We have surprisingly discovered that essentially pure ammonia streams can be successfully destroyed without creating appreciable quantities of oxides of nitrogen by employing oxygen-enriched air or its equivalent to support combustion of the ammonia, provided that sub-stoichiometric combustion conditions are maintained in the furnace in which the destruction is carried out.

SUMMARY OF THE INVENTION

According to the present invention there is provided a method of destroying a waste gas containing at least 50 per cent by volume of ammonia, comprising the steps of:

(a) supplying at least one stream of the waste gas to a reaction region;

(b) supplying molecules of oxygen to the reaction region either in at least one stream of oxygen-enriched air or in separate streams of (i) air unenriched in oxygen and (ii) pure oxygen or oxygen-enriched air;

(c) both burning and thermally cracking ammonia in the reaction region; and (d) taking from the reaction region an effluent gas stream, comprising nitrogen, water vapour, argon, and hydrogen but being essentially free of nitric oxide, nitrogen dioxide, and dinitrogen tetroxide and essentially free of ammonia, wherein (i) the mole ratio of oxygen molecules to all non-combustible gas molecules (including oxygen molecules) supplied to the reaction region is in the range of 28:100 to 70:100;

(ii) the rate of supplying oxygen molecules to the reaction region is from 75 to 98% of the stoichometric rate required for full combustion of all combustible fluids supplied to the reaction region;

(iii) and essentially no hydrogen sulphide is supplied to the reaction region.

By employing oxygen-enriched air, or equivalent separate supplies of oxygen and air, containing at least 28 mole per cent of oxygen, it becomes possible to create in the ammonia flame a sufficiently high temperature to cause some of the ammonia to crack thermally to form ammonia and hydrogen. This sub-stoichometric oxidation conditions can be maintained in the reaction region while obtaining essentially complete destruction of ammonia. A consequence of operation under sub-stoichometric oxidation conditions is that any oxides of nitrogen that are formed, i.e. nitric oxide, nitrogen dioxide or dinitrogen tetroxide, can be reduced to nitrogen by reductant(s) present in the reaction region.

Preferably, the rate of supplying oxygen molecules to the reaction region is from 80 to 90 per cent of the stoichiometric rate required for full combustion of all combustible fluids supplied to the reaction region. At such a rate a favourable combination of destruction of ammonia by combustion and by thermal cracking can be achieved.

Preferably, the reaction region, or at least part of it is defined in a furnace. Preferably, the flow rate of at least one influent stream into the furnace is controlled so as to maintain the temperature of the effluent gas at the exit of the furnace in the range of 1300° C. to 1700° C. At temperatures above 1700° C., damage tends to be done to the furnace, particularly any refractory lining thereof.

Preferably, the effluent gas contains more than 4 per cent by volume of hydrogen. More preferably, the effluent gas contains from 5 to 10 per cent by volume of hydrogen. Such effluent gas compositions are typically flammable and can therefore be burned to form a tail gas which may be discharged to the atmosphere, if necessary, after removal of any remaining traces of ammonia by dissolving such traces in water or other aqueous medium.

Selecting a mole ratio of oxygen molecules to all non-combustible gas molecules (including oxygen molecules) supplied to the reaction which is significantly above the minimum of 28:100, and a rate of supplying oxygen molecules to the reaction region of less than 90 per cent of the stoichometric rate required for full combustion of all combustible fluids both facilitate the production of an effluent gas stream which can readily be burned.

If, for example, the effluent gas stream is not flammable or is not able to sustain a stable flame, the concentration of hydrogen in it can be enhanced by any of the following measures if taken upstream of the combustion of the effluent gas stream:

(i) condensation or adsorption of at least part of its water vapour content;

(ii) separation by PSA or membranes to enhance its hydrogen content;

(iii) addition of a fuel gas thereto.

Measure (i) may be performed by cooling the effluent gas stream and contacting the cooled effluent gas stream with water or other aqueous medium.

Although it is generally performed to burn the effluent gas stream and discharge the resulting tail gas to the atmosphere, if desired, after treatment of the effluent gas stream to remove the last traces of ammonia therefrom, other methods of treating the effluent gas stream are possible. For example, the effluent gas stream may be subjected to separation so as to obtain a more concentrated fuel gas such as essentially pure hydrogen product. Another option, which is preferred if a small amount of hydrogen sulphide is supplied to the reaction region, is to supply the effluent gas stream to a unit for cleaning a tail gas from a Claus plant.

The expression "essentially no hydrogen sulphide is supplied to the reaction region" should be understood to encompass the supply of hydrogen sulphide to the reaction region at a low rate, i.e. such that up to 5 mole per cent of the combustibles supplied to this region is formed of hydrogen sulphides with the effluent gas stream being suitable for treatment in a unit for cleaning a tail gas from a Claus plant.

The reaction region is readily operable so as to avoid the creation of an effluent gas stream that contains any of ammonia, nitric oxide, dinitrogen tetroxide, and nitrogen dioxide.

Preferably, all the waste gas is fed to a burner which fires into the reaction region. Alternatively, some of the waste gas may be introduced into the reaction region downstream of the flame created by operation of the burner. The ammonia introduced into the downstream region can then react with any nitric oxide, nitrogen dioxide or dinitrogen tetroxide in the combustion products produced by operation of the burner.

The effluent gas stream is preferably burned in a further furnace into which a further burner fires. The entire effluent gas stream is preferably supplied to the further burner. Combustion of the effluent gas stream may be supported by air or pure oxygen, or by oxygen-enriched air. The effluent gas stream is preferably cooled intermediate the furnaces.

BRIEF DESCRIPTION OF THE INVENTION

Figure 2:

The method according to the invention will now be described by way of example with reference to the accompanying drawings, in which:

FIG. 1 is a schematic flow diagram of a plant for the destruction of a waste gas stream comprising at least 50 per cent by volume of ammonia but essentially no hydrogen sulphide, and FIG. 2 is a graph illustrating the variation in the NOx content of the effluent gas stream from the combustion of pure ammonia with the ratio of oxygen molecules to ammonia molecules.

DETAILED DESCRIPTION OF THE INVENTION

Referring to FIG. 1 of the drawings, a gas stream containing at least 50 per cent by volume of ammonia is fed along a pipeline 2 to an oxygen-air-fuel burner 4 which fires into a furnace 6. The gas stream is preferably pure ammonia, but may contain impurities, particularly non-combustible impurities such as water vapour, nitrogen, argon and carbon dioxide. Preferably, these impurities constitute no more than 10 per cent by volume of the gas stream containing ammonia. The impurities may also include combustible impurities. In particular, a small amount of hydrogen sulphide may be present. Typically, hydrogen sulphide may constitute up to about 5 per cent by volume of the gas stream containing ammonia. Up to such levels, the presence of hydrogen sulphide is typically insufficient to require its treatment in, for example, a Claus process for recovering sulphur from hydrogen sulphide.

A stream of pure oxygen or oxygen-enriched air is supplied along a pipeline 8 to the burner 4. In addition, the burner 4 is supplied with a stream of air along a pipeline 10.

The gas streams that are sent to the burner are preferably the only gas streams which enter the reaction furnace. The rates of supply of the gas streams to the furnace 6 are selected such that the mole ratio of oxygen molecules to all non-combustible gas molecules (including oxygen molecules) supplied to the furnace 6 is in the range of 28:100 to 70:100. Preferably, this ratio is in the range of 30:100 to 50:100. Lower ratios make it more difficult to destroy the ammonia; higher ratios may create difficulties in preventing excessive temperatures from being created in the furnace 6 which might cause damage to it.

Two main chemical reactions take place in the furnace 6. The first is the reaction of ammonia and oxygen to form nitrogen and water vapour. The second is the thermal decomposition or cracking of ammonia to form nitrogen and hydrogen. The latter reaction is facilitated by the creation in the flame zone of the burner of relatively hot regions into which oxygen or oxygen-enriched air and ammonia are directed. The stoichiometry of the reaction between ammonia and oxygen is in accordance with the following equation:

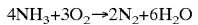

$$4NH_3 + 3O_2 \rightarrow 2N_2 + 6H_2O$$

We have surprisingly found that the total destruction of ammonia without substantial formation of nitric oxide and nitrogen dioxide (and its dimer dinitrogen tetroxide) can be achieved if the rate of supplying oxygen molecules to the furnace 6 is no more than 98 per cent of that required by the stoichiometry of the reaction between ammonia and oxygen. This is shown in FIG. 2 of the drawings. When the rate of supply in oxygen is 128 per cent of the stoichiometric rate required for complete combustion of ammonia, it can be seen from FIG. 2 that the amount of NOx (nitric oxide and nitrogen dioxide) formed is in excess of 2,500 parts per million by volume. As the rate of supply of oxygen is reduced so the content of NOx in the effluent gas falls to zero at a rate of oxygen supply 98 per cent of the stoichiometric rate required for complete combustion. If the rate of oxygen supply is further reduced to 90 per cent of the stoichiometric rate, the proportion of NOx in the effluent gas from the furnace 6 still remains at zero. This indicates that if the rate of oxygen supply is reduced yet further, the rate of NOx formation will remain zero. Operating with a rate of supply of oxygen molecules in the range of 80 to 90 per cent of the stoichiometric rate for full combustion of ammonia is therefore preferred as it reduces the risk of any fluctuations in the rate of supply of ammonia causing formation of a permanent amount of NOx. Surprisingly, we have found that at such rates of oxygen supply, the presence of ammonia in the effluent gas stream from the furnace can still nonetheless be avoided. This we attribute to thermal cracking of the ammonia.

The reason why a stoichiometric deficit of oxygen creates conditions which are hostile to the permanent formation of nitric oxide and nitrogen dioxide is that when there is such a deficit of oxygen the excess ammonia readily reduces any oxides of nitrogen that are transiently formed.

Referring again to FIG. 1 of the drawings, an effluent gas mixture comprising nitrogen, hydrogen, water vapour and argon leaves the first furnace 6 at a temperature in the range of 1300° C. to 1700° C. through an outlet 12. The effluent gas mixture typically contains more than 5 per cent by volume of hydrogen and is therefore readily flammable. If desired, the rate of supply of oxygen and air supplied to the burner 6 can be controlled so as to keep the exit temperature of the effluent gas stream within a chosen range.

The effluent gas stream is cooled in a waste heat boiler 14 typically to a temperature in the range of 200° C. to 400° C. The resulting cooled effluent gas stream then flows into a second burner 16 which fires into a second furnace 18. Oxygen or oxygen-enriched air is supplied along a pipeline 20 to the burner 16. Similarly, air is supplied along a pipeline 22 to the burner 16. If desired, the burner may be operated slightly sub-stoichiometrically in order to inhibit formation of oxides and nitrogen. As a result of combustion of the effluent gas stream by means of the second burner 16 firing into the second furnace 18, an effluent gas is formed which is generally suitable for discharge to the atmosphere. If some ammonia is contained in the effluent gas leaving the furnace 6 it is generally desirable to subject this gas to contact with water so as to remove the ammonia intermediate the waste heat boiler 12 and the furnace 18 or to perform this step in a quench tower 24 downstream of the furnace 18. The resultant tail gas can then be sent from the quench tower 24 to a stack (not shown) for discharge to the atmosphere. If desired, most of the quench water may be re-circulated to the quench tower with a small proportion being introduced into, for example, the ammonia pipeline 2. If the gas stream containing ammonia contains a small amount of hydrogen sulphide, it may be desirable to send the tail gas along a pipeline 26 to a cleaning unit (not shown) associated with a Claus plant (not shown) for the recovery of sulphur from an acid gas comprising hydrogen sulphide rather than to a stack.

I claim:

1. A method of destroying a waste gas containing at least 50 per cent by volume of ammonia, comprising the steps of:
   (a) supplying at least one stream of the waste gas to a reaction region;
   (b) supplying molecules of oxygen to the reaction region either in at least one stream of oxygen-enriched air or in separate streams of (i) air unenriched in oxygen and (ii) pure oxygen or oxygen-enriched air;
   (c) both burning and thermally cracking ammonia in the reaction region; and
   (d) taking from the reaction region an effluent gas stream, comprising nitrogen, water vapour, argon, and hydrogen, but being essentially free of nitric oxide, nitrogen dioxide, and dinitrogen tetroxide and essentially free of ammonia, wherein
      (i) the mole ratio of oxygen molecules to all non-combustible gas molecules (including oxygen molecules) supplied to the reaction region is in the range of 28:100 to 70:100;
      (ii) the rate of supplying oxygen molecules to the reaction region is from 75 to 98% of the stoichiometric rate required for full combustion of all combustible fluids supplied to the reaction region;
      (iii) and essentially no hydrogen sulphide is supplied to the reaction region.

2. The method claimed in claim 1, wherein the rate of supplying oxygen molecules to the reaction region is from 80 to 90 per cent of the stoichiometric rate required for complete combustion of all combustible fluids supplied to the reaction region.

3. The method claimed in claim 1, in which the reaction region, or at least part of it is defined in a furnace.

4. The method claimed in claim 1, in which the flow rate of at least one influent stream into the reaction region is controlled so as to maintain the temperature of the effluent gas in the range of 1300° C. to 1700° C.

5. The method claimed in claim 1, in which the effluent gas contains more than 4 per cent by volume of hydrogen.

6. The method claimed in claim 5, in which the effluent gas contains from 5 to 10 per cent by volume of hydrogen.

7. The method claimed in claim 1, wherein the concentration of hydrogen in the effluent gas is enhanced by condensation or adsorption of at least part of its water vapour content.

8. The method claimed in claim 7, in which the water vapour is condensed by cooling the effluent gas stream and compacting the cooled effluent gas stream with water or other aqueous medium.

9. The method claimed in claim 1, in which the effluent gas stream is separated by PSA or membranes to enhance its hydrogen content.

10. The method claimed in claim 1, in which a fuel gas is added to the effluent gas stream.

11. The method claimed in claim 1, in which the effluent gas stream is burned and the resulting tail gas is discharged to the atmosphere.

12. The method claimed in claim 1, in which the waste gas contains a small amount of hydrogen sulphide, the effluent gas stream is burned, and the resulting tail gas is supplied to a unit for cleaning a tail gas from a Claus plant for the recovery of sulphur from hydrogen sulphide.

13. The method claimed in claim 1, in which the effluent gas stream is separated to produce a hydrogen product.

14. The method claimed in claim 1, in which all the waste gas is fed to a burner which fires into the reaction region.

15. The method claimed in claim 14, in which the effluent gas stream is burned in a further furnace into which a further burner fires.

16. The method claimed in claim 15, in which a tail gas is withdrawn from the further furnace and is washed with a stream of water or other aqueous medium.

17. The method claimed in claim 1, in which the waste gas contains at least 90 per cent by volume of ammonia.

* * * * *